(12) United States Patent
Harada

(10) Patent No.: US 7,546,238 B2
(45) Date of Patent: Jun. 9, 2009

(54) DIGITAL CIRCUIT TRANSMISSION DEVICE

(75) Inventor: Yoshihisa Harada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 949 days.

(21) Appl. No.: 10/474,011

(22) PCT Filed: Feb. 4, 2002

(86) PCT No.: PCT/JP02/00894

§ 371 (c)(1),
(2), (4) Date: Oct. 6, 2003

(87) PCT Pub. No.: WO03/067792

PCT Pub. Date: Aug. 14, 2003

(65) Prior Publication Data

US 2004/0107092 A1 Jun. 3, 2004

(51) Int. Cl.
*G10L 11/06* (2006.01)
(52) U.S. Cl. .................... 704/214; 704/215; 704/221
(58) Field of Classification Search ............... 704/714, 704/715, 221, 214, 215
See application file for complete search history.

(56) References Cited

U.S. PATENT DOCUMENTS

| | | | | |
|---|---|---|---|---|
| 4,677,656 A * | 6/1987 | Burke et al. | ............... | 455/403 |
| 5,307,441 A * | 4/1994 | Tzeng | ................... | 704/222 |
| 5,774,457 A | 6/1998 | Iizawa | | |
| 5,864,793 A * | 1/1999 | Mesiwala et al. | ........... | 704/214 |
| 5,970,443 A * | 10/1999 | Fujii | ................... | 704/222 |
| 6,078,882 A * | 6/2000 | Sato et al. | .............. | 704/233 |
| 6,097,965 A * | 8/2000 | Honkasalo et al. | ....... | 455/452.2 |
| 6,182,032 B1 * | 1/2001 | Rapeli | ................... | 704/214 |
| 6,446,042 B1 * | 9/2002 | Detlef et al. | ........... | 704/275 |
| 6,941,269 B1 * | 9/2005 | Cohen et al. | ........... | 704/275 |
| 7,120,578 B2 * | 10/2006 | Thyssen et al. | ........... | 704/221 |

FOREIGN PATENT DOCUMENTS

| | | |
|---|---|---|
| CN | 1331826 A | 1/2002 |
| JP | 63-226138 | 9/1988 |
| JP | 1-305739 | 12/1989 |
| JP | 4-168822 | 6/1992 |
| JP | 5-91064 | 4/1993 |
| JP | 6-268606 | 9/1994 |
| JP | 9-219690 | 8/1997 |
| JP | 2001-195100 | 7/2001 |

* cited by examiner

*Primary Examiner*—Michael N Opsasnick
(74) *Attorney, Agent, or Firm*—Oblon, Spivak, McClelland, Maier & Neustadt, P.C.

(57) ABSTRACT

A digital line transmission unit can carry out switching between speech codecs during the same call to achieve balance between making effective use of a line and a high sound quality without bringing about a feeling of discomfort in a user by the switching. It includes in an encoder a first speech codec 7 with a high sound quality and a high bit rate, a second speech codec 8 with a reasonable sound quality but a low bit rate. It carries out switching between these speech codecs in response to the control information an operation monitoring controller 4 obtains by making a decision as to the traffic volume of the bearer line 111. The switching between the speech codecs is made during a speech pause a speech burst detector 31 in a signal detector 3 detects in an input speech signal.

18 Claims, 12 Drawing Sheets

DIGITAL CIRCUIT TRANSMISSION DEVICE

TECHNICAL FIELD

The present invention relates to a digital line transmission unit used for digital communication and capable of transmitting speech signals at high efficiency.

BACKGROUND ART

Regardless of public line or intracompany communications, it is a problem of communications to reduce communication cost and increasing availability of the line. To achieve high efficiency transmission of speech signals forming a great majority of communication traffic, a variety of speech encoding schemes are implemented. Recently, digital line transmission units have been implemented which utilize high efficiency speech encoding units based on low bit rate speech encoding/decoding schemes typified by an 8 kbit/s CS-ACELP (Conjugate-Structure Algebraic-Code-Excited Linear Prediction) speech encoding scheme.

To make the best possible use of a line, a more efficient speech encoding unit (called "speech codec" from now on) must be employed. In other words, a lower rate speech encoding unit must be applied. Consider a case where a low-bit-rate speech codec is applied. For example, applying an 8-kbit/s speech codec to a 64-kbit/s speech PCM signal can increase the compression efficiency by a factor of eight. In contrast, applying 32-kbit/s speech codec can achieve compression efficiency by a factor of two.

Although some low-bit-rate encoding/decoding schemes of the speech codecs achieve high sound quality, it is obvious that high-bit-rate codecs generally bring about higher sound quality than low-bit-rate codecs.

Accordingly, the concept has been developed that when a communication line allows a margin for information transmission, a highest-possible-bit-rate codec is used to secure sound quality, whereas when it leaves little margin for information transmission, a low-bit-rate codec is used to make the best possible use of the communication line. This type includes a unit that varies the bit rate of the speech codec used for the speech encoding/decoding depending on the line condition by applying a variable rate codec, and a unit that switches the codecs in accordance with the traffic volume on the communication line.

FIG. 1 is a block diagram showing a configuration of a conventional digital line transmission unit that switches the codecs, which is disclosed in Japanese patent application laid-open No. 63-226138/1988, for example. In FIG. 1, the reference numeral 40 designates a transmitting side transmission unit, and 45 designates an input line to which a speech signal is input. The reference numeral 46 designates a 64-kbit/s codec for receiving the speech signal and outputting an encoded speech signal; 47 designates a 32-kbit/s codec for receiving the speech signal and outputting an encoded speech signal; and 48 designates a 16-kbit/s codec for receiving the speech signal and outputting a speech compression signal. The reference numeral 49 designates a selector for receiving the speech compression signals from these codecs and outputting a selected speech compression signal. The reference numeral 50 designates a multiplexing/demultiplexing circuit for receiving the selected speech compression signal and a control signal and outputting a multiplexed signal. The reference numeral 51 designates a control circuit for outputting a control signal. The reference numeral 60 designates a receiving side transmission unit, in which the reference numeral 66 designates a 64-kbit/s codec for receiving a speech compression signal and outputting a speech signal, 67 designates a 32-kbit/s codec for receiving the speech compression signal and outputting the speech signal, and 68 designates a 16-kbit/s codec for receiving the speech compression signal and outputting the speech signal. The reference numeral 69 designates a selector for receiving the speech compression signal and supplying it to the codecs. The reference numeral 70 designates a multiplexing/demultiplexing circuit for receiving the multiplexed signal and outputting the speech compression signal and control information signal. The reference numeral 71 designates a control circuit for receiving the control information signal and outputting the control signal. The reference numeral 75 designates an output line for outputting the speech signal. The reference numeral 52 designates a digital line for interconnecting the transmitting side transmission unit 40 and the receiving side transmission unit 60.

Next, the operation will be described.

The speech signal input to the input line 45 is supplied to the 64-kbit/s codec 46, 32-kbit/s codec 47 and 16-kbit/s codec 48, which encode the speech signal and produce the speech compression signals. The speech compression signals the codecs output are supplied to the selector 49. The control circuit 51 detects the traffic on the digital line 52 before the speech signal is input to the individual codecs. To select the optimum speech compression signal for the current traffic volume, the control circuit 51 selects the codec to be used for the communication between the transmitting and receiving digital line transmission units from among the codecs 46, 47 and 48 in advance.

As for the transmission of the control information such as on selection and decision of the codec between the transmitting side transmission unit 40 and receiving side transmission unit 60, it is carried out between the control circuit 51 of the transmitting side transmission unit 40 and the control circuit 71 of the receiving side transmission unit 60 through a control information signal channel (shown in FIG. 2). FIG. 2 shows an example of a communication format. In this example, a control information signal channel S provided at the edge of information channels CH1, CH2, . . . , and CHn is used.

The selector 49 selects the codec with the optimum compression ratio for the telephone conversation in response to the control signal from the control circuit 51, and supplies the speech compression signal from the selected codec to the multiplexing/demultiplexing circuit 50. The multiplexing/demultiplexing circuit 50 multiplexes the digital signal corresponding to the speech compression which is selected and decided in response to the control signal from the control circuit 51, and transmits it through the digital line 52. The multiplexing/demultiplexing circuit 50 carries out the multiplexing and demultiplexing not only of the speech compression signal, but also of the control information signal between the control circuits 51 and 71.

In the receiving side transmission unit 60, the multiplexing/demultiplexing circuit 70 demultiplexes the speech compression signal (encoded speech signal), which is supplied to the selector 69. The encoded speech signal is supplied to the codec which is selected and decided in response to the control signal fed from the control circuit 71. The 64-kbit/s codec 66, 32-kbit/s codec 67 and 16-kbit/s codec 68 decode the encoded speech signal fed from the selector 69 to generate the speech signal. The speech signal is output in accordance with the designation of the control signal about the codec output by the control circuit 71.

When the codec is switched in the same call, the conventional digital line transmission unit involves a processing delay difference in the codecs based on different encoding/ decoding schemes. Thus, the switching will bring about omission or overlap of the speech signal, giving an unnatural feeling to the auditory perception. To avoid this, the switching of the codec to be used is made on a call by call basis. More specifically, it checks inherent information on the control between adjacent multiplexing transmission units, which is transmitted through the control information signal channel as shown in FIG. 2, decides the codec to be used in accordance with the line condition in advance by the time an outgoing call processing or an incoming call processing is completed, followed by the transmission or reception (that is, by the time the call is established), and uses the same codec until the call has been completed.

With the foregoing configuration, the conventional digital line transmission unit has a problem in that since it cannot switch the codec while a call holds, it cannot increase the efficiency in terms of making effective use of the line.

The present invention is implemented to solve the foregoing problems. Therefore an object of the present invention is to provide a digital line transmission unit capable of giving a natural feeling to the auditory perception in spite of the switching between the speech codecs in accordance with the condition of the communication line, and capable of enabling effective use of the communication line without fail.

DISCLOSURE OF THE INVENTION

According to one aspect of the present invention, there is provided a digital line transmission unit for carrying out compression encoding, the digital line transmission unit comprising: an encoder/decoder including a first speech encoding unit for encoding and decoding a speech signal, a second speech encoding unit for encoding and decoding the speech signal, and a non-speech encoding unit for encoding and decoding a non-speech signal; signal discriminator including a speech burst detector for detecting as to whether an input signal to the encoder/decoder is a speech burst or speech pause, and a speech/non-speech signal discriminator for deciding as to whether the input signal is a speech signal or non-speech signal; a signal multiplexing/demultiplexing section for multiplexing outputs of the first speech encoding unit, the second speech encoding unit and the non-speech encoding unit; and a switching unit for supplying the input signal to one of the first speech encoding unit, the second speech encoding unit and the non-speech encoding unit, wherein when the input signal is the speech pause, switching between the first speech encoding unit and the second speech encoding unit is carried out to supply the input signal to one of them.

Thus, it offers an advantage of being able to carry out switching between the speech codecs in the same call, and to make effective use of the line.

In digital line transmission unit, the encoder/decoder may further comprise: a first delay element for delaying a speech signal output from the first speech encoding unit; and a second delay element for delaying a speech signal output from the second speech encoding unit.

Thus, it offers an advantage of being able to match all the processing delays in the digital line transmission unit even when the speech codecs have different processing delays, thereby making it possible for a user to scarcely aware of the switching between the speech codecs in the same call.

The digital line transmission unit may further comprise a speech pause duration measuring section for measuring speech pause duration of a speech pause of the input signal fed to the encoder/decoder, wherein the switching between the first speech encoding unit and the second speech encoding unit may be carried out when the speech pause duration is longer than a preset time period.

Thus, it offers an advantage of being able to make the user hardly aware of the sound quality difference between the switched speech codecs, thereby enabling the user to make more natural conversation without being aware of the switching.

The digital line transmission unit may further comprise an operation monitoring console for monitoring operational information and for making necessary setting, wherein the operation monitoring console may be used to specify a decision threshold value for making a decision as to a traffic volume of a digital line, and the switching between the first speech encoding unit and the second speech encoding unit may be carried out with reference to the decision threshold value.

Thus, it offers an advantage of enabling an operator to determine the decision threshold value considering the used state of the line, thereby making it possible to enhance the convenience of the digital line transmission unit.

The digital line transmission unit may further comprise an operation monitoring console for monitoring operational information and for making necessary setting, wherein the operation monitoring console may be used to specify the preset time period of the speech pause duration that is used when carrying out the switching between the first speech coding unit and the second speech coding unit.

Thus, it offers an advantage of enabling an operator to determine the preset time period considering the used state of the line, thereby making it possible to enhance the convenience of the digital line transmission unit.

In the digital line transmission unit, the operation monitoring console may comprise a timer for counting time, wherein different decision threshold values may be used as a reference in accordance with the time counted by the timer.

Thus, it offers an advantage of being able to reduce a burden on an operator, and to carry out more sophisticated operation in accordance with the time, thereby making it possible to enhance the convenience of the digital line transmission unit.

In the digital line transmission unit, the operation monitoring console may comprise a timer for counting time, wherein different preset time periods of the speech pause duration, which is used when carrying out the switching between the first speech coding unit and the second speech coding unit, may be used in accordance with the time counted by the timer.

Thus, it offers an advantage of being able to reduce a burden on an operator, and to carry out more sophisticated operation in accordance with the time, thereby making it possible to enhance the convenience of the digital line transmission unit.

BEST MODE FOR CARRYING OUT THE INVENTION

The best mode for carrying out the present invention will now be described with reference to the accompanying drawings to explain the present invention in more detail.

EMBODIMENT 1

Figure 1:
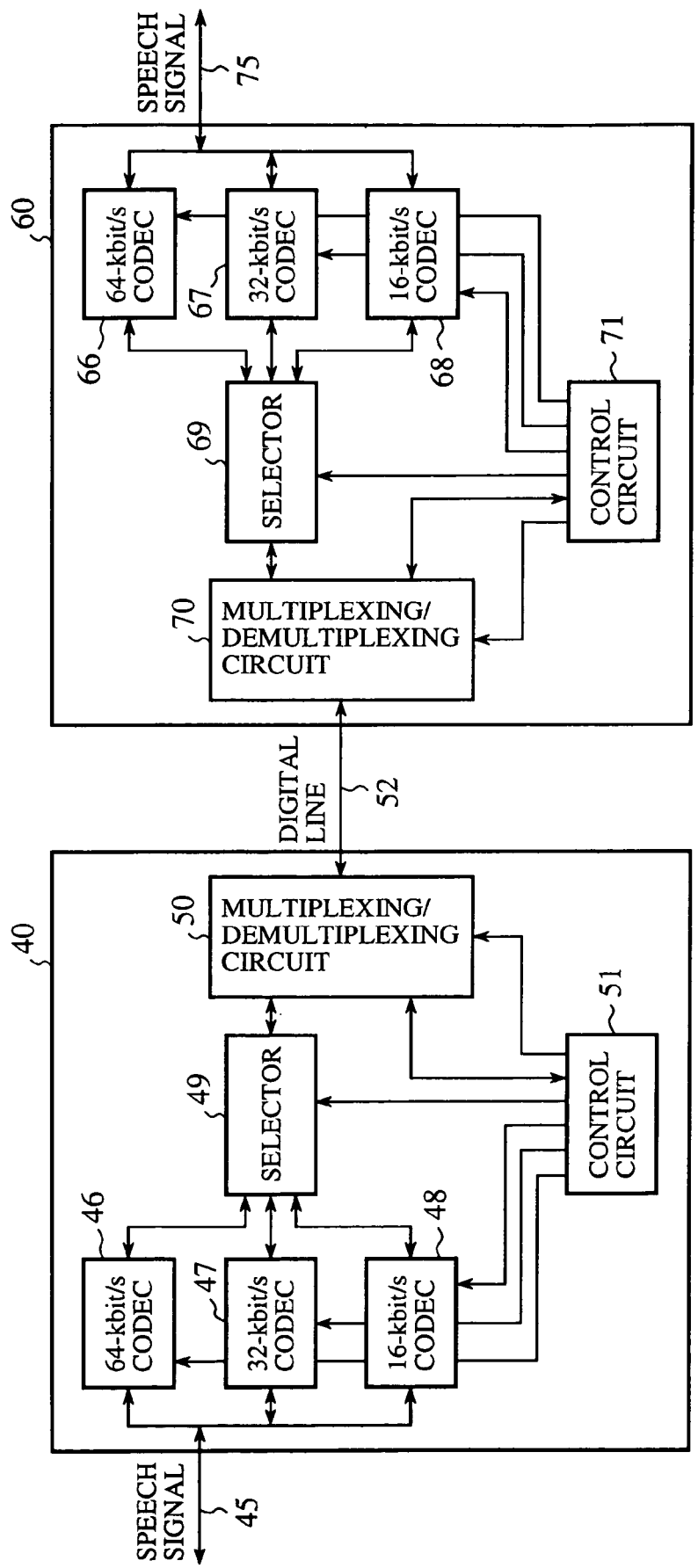
FIG. 1 is a block diagram showing a configuration of a conventional digital line transmission unit.
Figure 2:
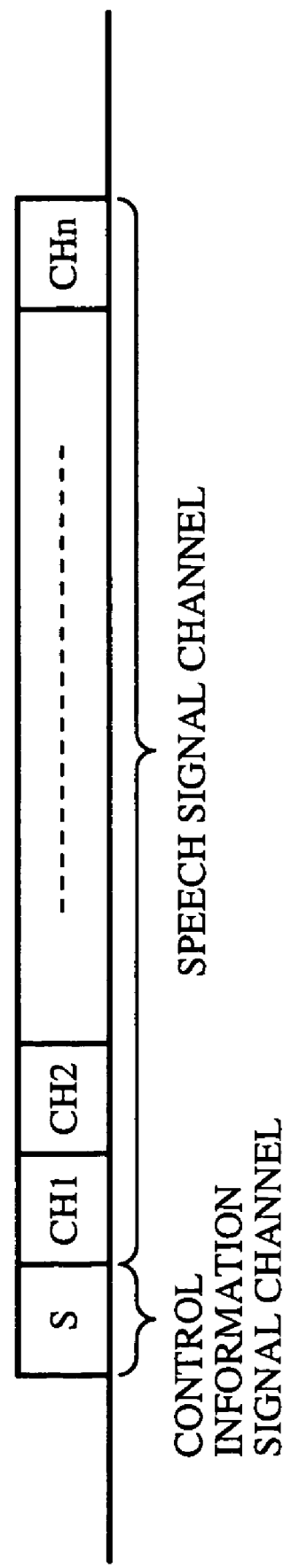
FIG. 2 is a diagram illustrating an example of a communication format between digital line transmission units.
Figure 3:
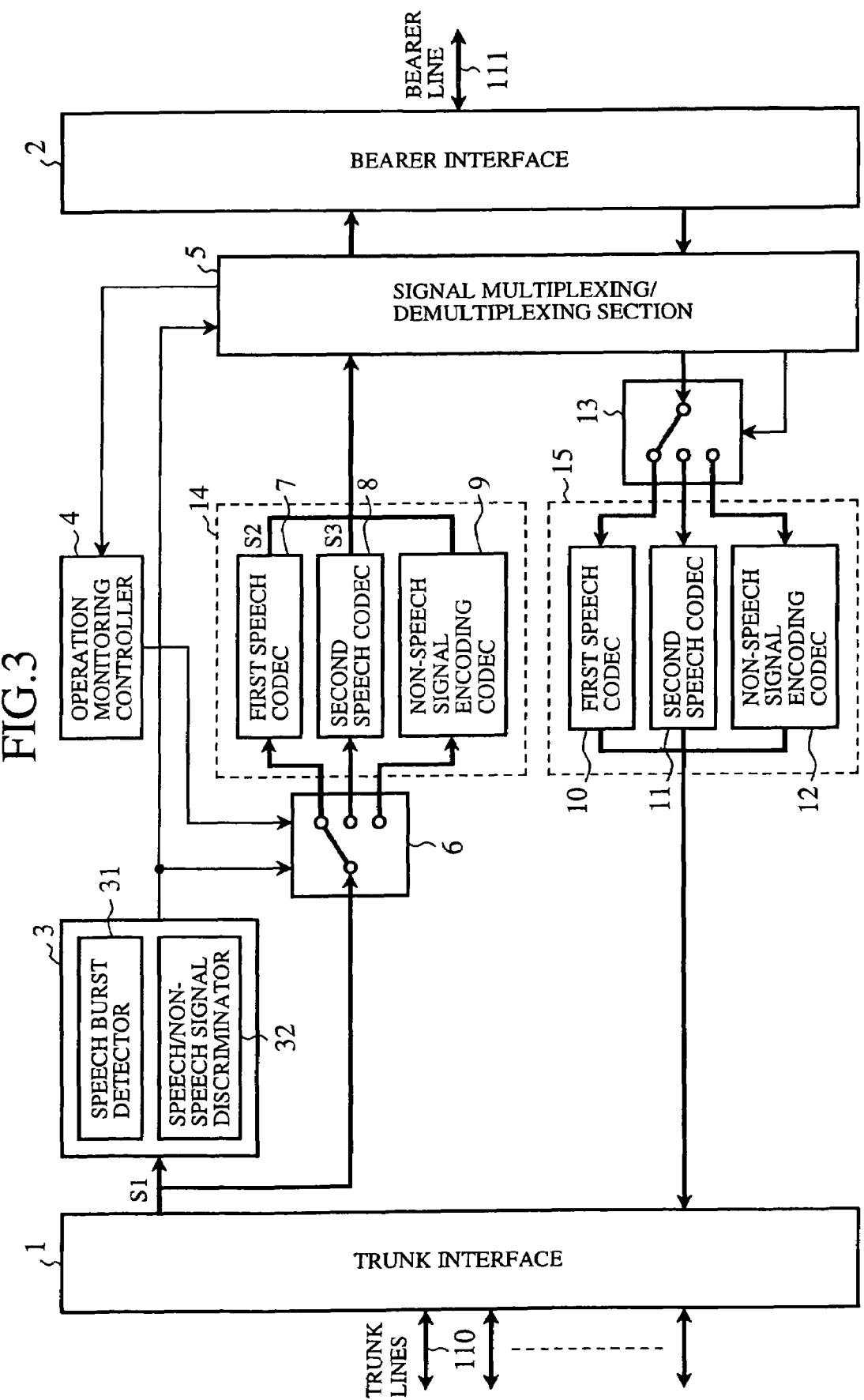
FIG. 3 is a block diagram showing a configuration of a first embodiment of the digital line transmission unit in accordance with the present invention.

FIG. 3 is a block diagram showing a configuration of an embodiment 1 of the digital line transmission unit in accordance with the present invention. In FIG. 1, the reference numeral 110 designates a plurality of trunk lines for transmitting input signals (speech signals, VBD (Voice Band Data) and FAX signals). The reference numeral 1 designates a trunk interface for receiving the input signals from the trunk lines 110 and a decoded signal from a decoder 15, and for outputting a format-converted input signal and an output signal to the trunk lines 110. The reference numeral 3 designates a signal detector for detecting and identifying the format-converted input signal from the trunk interface 1; 31 designates a speech burst detector for producing speech burst information; and 32 designates a speech/non-speech discriminator for producing speech/non-speech discrimination information. The signal detector 3 consists of the speech burst detector 31 and speech/non-speech discriminator 32.

The reference numeral 4 designates an operation monitoring controller for receiving traffic information and producing control information. The reference numeral 6 designates a transmitting side codec switching unit for receiving the format-converted input signal, speech burst information, speech/non-speech discrimination information and control information, and for outputting the format-converted input signal. The reference numeral 14 designates an encoder for receiving the format-converted input signal output from the transmitting side codec switching unit 6, and for outputting an encoded signal. The reference numeral 7 designates a first speech codec for receiving the format-converted input signal selected by the transmitting side codec switching unit 6, and for outputting an encoded speech signal as the encoded signal; 8 designates a second speech codec for receiving the format-converted input signal selected by the transmitting side codec switching unit 6, and for outputting an encoded speech signal as the encoded signal; and 9 designates a non-speech signal encoding codec for receiving the format-converted input signal selected by the transmitting side codec switching unit 6, and for outputting a non-speech encoded signal as the encoded signal. The encoder 14 is composed of the first speech codec 7, second speech codec 8 and non-speech signal encoding codec 9.

The reference numeral 5 designates a signal multiplexing/demultiplexing section for receiving the encoded signal from the encoder 14, the speech burst information and speech/non-speech discrimination information from the signal detector 3, and a format-converted received signal from a bearer interface 2, and for outputting a multiplexed transmission signal, traffic information, demultiplexed received signal, and information about codec. The reference numeral 2 designates the bearer interface for receiving a received signal from the bearer line 111 and the multiplexed transmission signal from the signal multiplexing/demultiplexing section 5, and for outputting the format-converted received signal and the transmission signal to the bearer line 111. The reference numeral 111 designates the bearer line. The reference numeral 13 designates a receiving side codec switching unit for receiving the demultiplexed received signal and information about codec, and for outputting the demultiplexed received signal.

The reference numeral 15 designates a decoder for receiving the demultiplexed received signal, and for outputting a decoded signal. The reference numeral 10 designates a first speech codec for receiving the demultiplexed received signal selected by the receiving side codec switching unit 13, and for outputting a decoded speech signal as the decoded signal. The reference numeral 11 designates a second speech codec for receiving the demultiplexed received signal selected by the receiving side codec switching unit 13, and for outputting a decoded speech signal as the decoded signal. The reference numeral 12 designates a non-speech signal encoding codec for receiving the demultiplexed received signal selected by the receiving side codec switching unit 13, and for outputting a decoded non-speech signal as the decoded signal. The decoder 15 consists of the first speech codec 10, second speech codec 11 and non-speech signal encoding codec 12.

Next, the operation will be described.

First, the operation of the transmitting side, that is, the encoding side will be described.

The input signal from each of the trunk lines 110 is input to the trunk interface 1. The trunk interface 1 converts the input signal into an internal processing format of the digital line transmission unit, and delivers the format-converted input signal to the signal detector 3 and transmitting side codec switching unit 6. In the signal detector 3, the speech burst detector 31 makes a decision as to whether the format-converted input signal is a speech burst or speech pause. In addition, the speech/non-speech signal discriminator 32 makes a decision as to whether the format-converted input signal is a speech signal or VBD (Voice band data) other than the speech signal. The decision results are delivered to the transmitting side codec switching unit 6 and signal multiplexing/demultiplexing section 5 as the speech burst information and speech/non-speech discrimination information.

The signal multiplexing/demultiplexing section 5 multiplexes the encoded signals output from the encoder 14 in response to the speech burst information and speech/non-speech discrimination signal output from the signal detector 3, and sends them to the bearer line 111 via the bearer interface 2 as the multiplexed transmission signal. Accordingly, the signal multiplexing/demultiplexing section 5 can detect the traffic volume of the multiplexed transmission signal as the traffic volume of the bearer line 111. It supplies the information on the traffic volume to the operation monitoring controller 4 as the traffic information.

According to the traffic information supplied from the signal multiplexing/demultiplexing section 5, the operation monitoring controller 4 makes a decision as to whether it is necessary to switch from the high-bit-rate speech codec to the low-bit-rate speech codec because of an increase in the traffic of the bearer line 111, or reversely from the low-bit-rate speech codec to the high-bit-rate speech codec because of a decrease in the traffic of the bearer line 111. If it decides that the switching is necessary, it sends the decision result to the transmitting side codec switching unit 6 as the control information.

Let us assume in FIG. 3 that the first speech codec 7 is the high-bit-rate codec, and the second speech codec 8 is the low-bit-rate codec. Thus, when the bearer line 111 is not congested (that is, when the traffic of the bearer line is not heavy), the first speech codec 7 is selected. On the contrary, when the bearer line 111 is congested (that is, when the traffic of the bearer line is heavy), the second speech codec 8 is selected.

According to the speech burst information and speech/non-speech discrimination information fed from the signal detector 3 and the control information fed from the operation monitoring controller 4, the transmitting side codec switching unit 6 carries out switching such that the format-converted input signal output from the trunk interface 1 is supplied to one of the first speech codec 7, second speech codec 8 and non-speech signal encoding codec 9.

Next, the operation of the transmitting side codec switching unit 6 will be described.

The transmitting side codec switching unit 6 supplies the format-converted input signal output from the trunk interface 1 to the second speech codec 8, when the speech burst information and speech/non-speech information fed from the signal detector 3 indicates that the format-converted input signal output from the trunk interface 1 is the speech burst and speech signal, and when the control information fed from the operation monitoring controller 4 indicates that the low-bit-rate speech codec should be used (because the traffic of the bearer line is heavy). On the other hand, the transmitting side codec switching unit 6 supplies the format-converted input signal output from the trunk interface 1 to the non-speech signal encoding codec 9, when the speech burst information and speech/non-speech information fed from the signal detector 3 indicates that the format-converted input signal output from the trunk interface 1 is the speech burst and non-speech signal.

Next, the operation of switching the speech codec which becomes necessary when the traffic volume of the bearer line 111 varies will be described with reference to FIG. 4.

Figure 4:
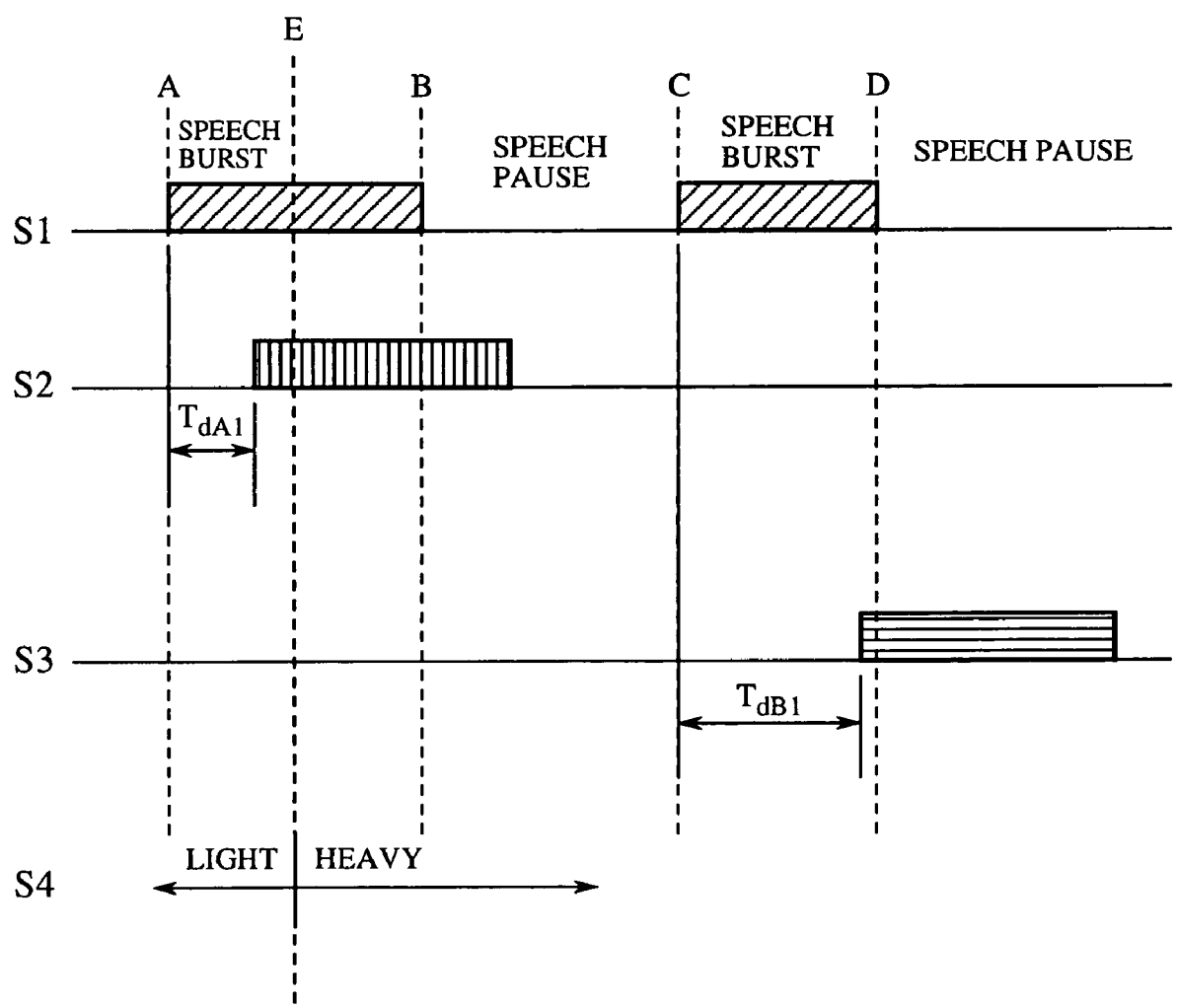
FIG. 4 is a diagram showing relationships between signal timings for illustrating the operation of the first embodiment of the digital line multiplexing unit in accordance with the present invention.

FIG. 4 is a diagram illustrating the operation of switching the speech codec from the high-bit-rate first speech codec 7 to the low-bit-rate second speech codec 8 because the traffic of the bearer line varies from light to heavy. In FIG. 4, the horizontal axis represents time (second). In addition, the symbol S1 denotes the format-converted input signal output from the trunk interface 1, S2 denotes the encoded speech signal output from the first speech codec 7, S3 denotes the encoded speech signal output from the second speech codec 8, and S4 denotes the traffic volume of the bearer line 111.

When the format-converted input signal S1 output from the trunk interface 1 changes from a speech pause to a speech burst (time A of FIG. 4), the traffic of the bearer line S4 is light. Accordingly, the transmitting side codec switching unit 6 selects the high-bit-rate first speech codec 7. The encoded speech signal S2 is output from the first speech codec 7 after a delay time $T_{dA1}$ (seconds) required for the processing has elapsed from the time A. When the format-converted input signal changes from the speech burst to a speech pause (at time B) after the traffic of the bearer line S4 varies from light to heavy (time E), the speech codec is switched to the low-bit-rate second speech codec 8. Subsequently, when the format-converted input signal changes from the speech pause to a speech burst (at time C), the second speech codec 8 carries out the encoding. The encoded speech signal S3 is output from the second speech codec 8 after a delay time $T_{dB1}$ (seconds) required for the processing has elapsed from the time C. Here, the control information output from the operation monitoring controller 4 reflects the traffic S4 of the bearer line.

The signal multiplexing/demultiplexing section 5 multiplexes the encoded speech signal S2 output from the first speech codec 7, the encoded speech signal S3 output from the second speech codec 8, and the non-speech encoded signal output from the non-speech signal encoding codec 9. Thus, they are supplied to the bearer interface 2 along with the information to be imposed on the control information signal channel as the multiplexed transmission signal, and are delivered to the bearer line 111 as the transmission signal.

Next, the operation of the receiving side, that is, the decoding side will be described.

The received signal from the bearer line 111 is input to the bearer interface 2. The bearer interface 2 converts the received signal to the internal processing format of the digital line transmission unit, and supplies the format-converted received signal to the signal multiplexing/demultiplexing section 5. The signal multiplexing/demultiplexing section 5 demultiplexes from the control channel transmitted via the bearer line 111 the information about codec which is contained in the control information on the adjacent digital line transmission unit (to which the received signal is to be transmitted), and supplies the information about codec to the receiving side codec switching unit 13.

According to the information about the codec of the adjacent digital line transmission unit, the receiving side codec switching unit 13 supplies the format-converted received signal to one of the first speech codec 10, second speech codec 11, and non-speech signal encoding codec 12. The decoded speech signal output from the first speech codec 10, the decoded speech signal output from the second speech codec 11 and the decoded non-speech signal output from the non-speech signal encoding codec 12 are supplied to one of the trunk lines 110 via the trunk interface 1 as the decoded signal.

The foregoing description is made by way of example in which the bearer line 111 changes its state from a readily available state to a congested state, and the switching is made from the first speech codec 7 to the second speech codec 8. As for the switching from the second speech codec 8 to the first speech codec 7, which is carried out when the bearer line 111 changes its state from a congested state to a readily available state, it is also made in response to the detection of a speech pause.

As described above, the present embodiment 1 of the digital line transmission unit comprises the encoder/decoder (14 and 15) including the first speech encoding unit (7 and 10) for encoding and decoding the speech signal, the second speech encoding unit (8 and 11) for encoding and decoding the speech signal, and the non-speech encoding unit (9 and 12) for encoding and decoding the non-speech signal; the signal detector (3) including the speech burst detector (31) for detecting whether the input signal to the encoder/decoder (14 and 15) is a speech burst or a speech pause, and the speech/non-speech signal discriminator (32) for discriminating whether the input signal is the speech signal or non-speech signal; the signal multiplexing/demultiplexing section (5) for multiplexing the outputs of the first speech encoding unit, second speech encoding unit and non-speech encoding unit; and the switching unit (6 and 13) for supplying the input signal to one of the first speech encoding unit, second speech encoding unit and non-speech encoding unit. The present embodiment 1 switches the input signal from the first speech encoding unit to the second speech encoding unit or vice versa during the speech pause.

As is clear from the foregoing description, the present embodiment 1 is configured such that it detects the speech pause of the input speech signal, and switches the speech codec used for the encoding/decoding when the input speech signal is in the speech pause. As a result, it offers an advantage of being able to switch the speech codec in the same call, thereby enabling the efficient use of the line.

EMBODIMENT 2

Figure 5:
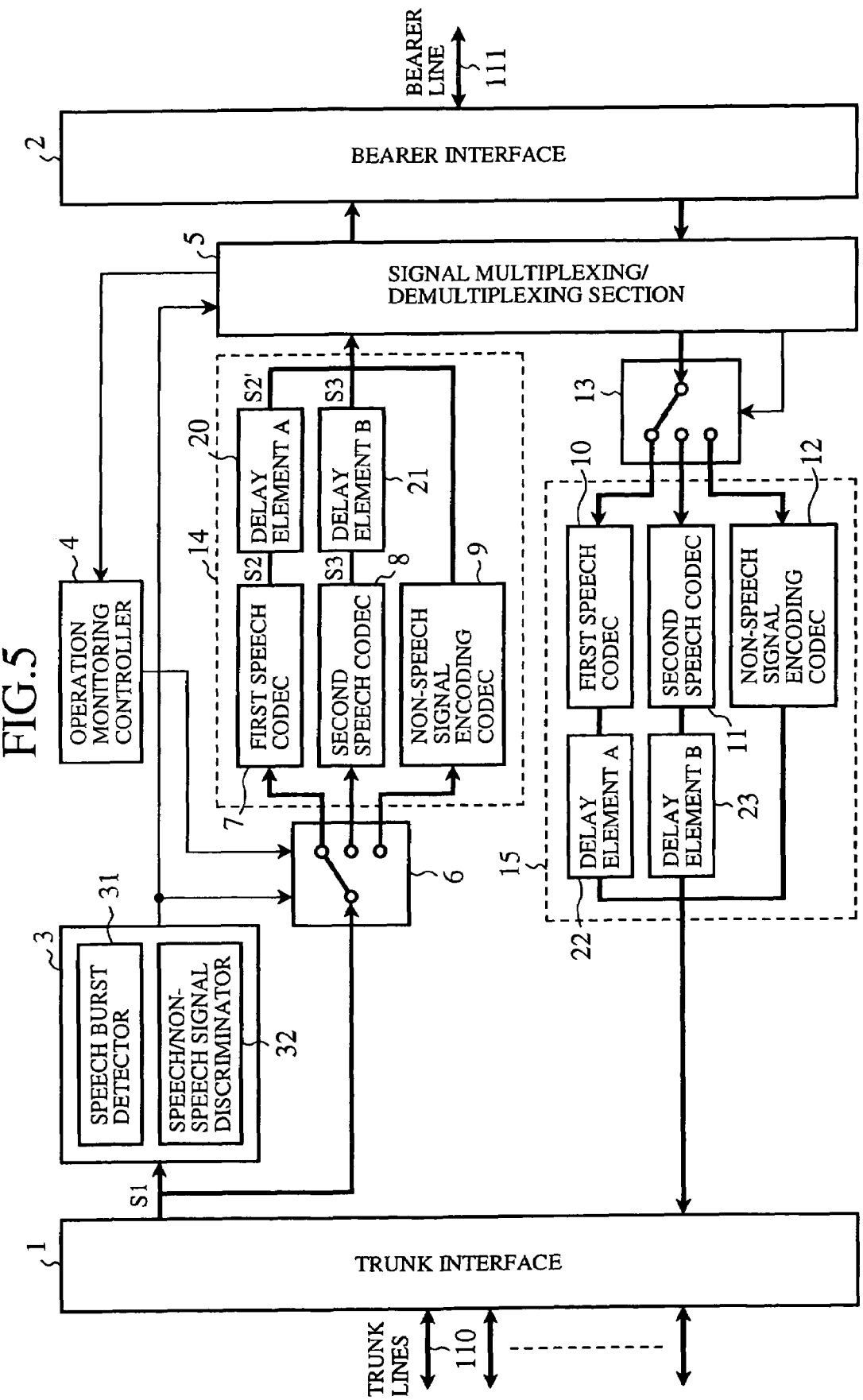
FIG. 5 is a block diagram showing a configuration of a second embodiment of the digital line transmission unit in accordance with the present invention.

FIG. 5 is a block diagram showing a configuration of an embodiment 2 of the digital line transmission unit in accordance with the present invention. In FIG. 5, the reference numeral 20 designates a delay element A for receiving the encoded speech signal from the first speech codec 7, and for outputting the delayed encoded speech signal. The reference numeral 21 designates a delay element B for receiving the encoded speech signal from the second speech codec 8, and for outputting the delayed encoded speech signal. The reference numeral 22 designates a delay element A for receiving the decoded speech signal from the first speech codec 10, and for outputting the delayed decoded speech signal. The reference numeral 23 designates a delay element B for receiving the decoded speech signal from the second speech codec 11, and for outputting the delayed decoded speech signal. In FIG. 5, the same reference numerals as those of the embodiment 1 as shown in FIG. 3 designate the same components.

Next, the operation will be described.

In the encoder 14, the encoded speech signal output from the first speech codec 7 is supplied to the delay element A 20. The delay element A 20 provides the encoded speech signal with a delay, and the delayed encoded speech signal is input to the signal multiplexing/demultiplexing section 5 as the encoded signal. Likewise, the delay element B 21 in the encoder 14 provides the encoded speech signal output from the second speech codec 8 with a delay, and the delayed encoded speech signal is input to the signal multiplexing/demultiplexing section 5 as the encoded signal.

In the decoder 15, the decoded speech signal output from the first speech codec 10 is input to the delay element A 22, and is provided with a delay. The delayed decoded speech signal is supplied to the trunk interface 1 as the decoded signal. Likewise, the decoded speech signal output from the second speech codec 11 in the decoder 15 is provided with a delay by the delay element B 23, and the delayed decoded speech signal is supplied to the trunk interface 1 as the decoded signal.

Next, the delays caused by the delay element A 20 and delay element B 21 will be described with reference to FIG. 6.

Figure 6:
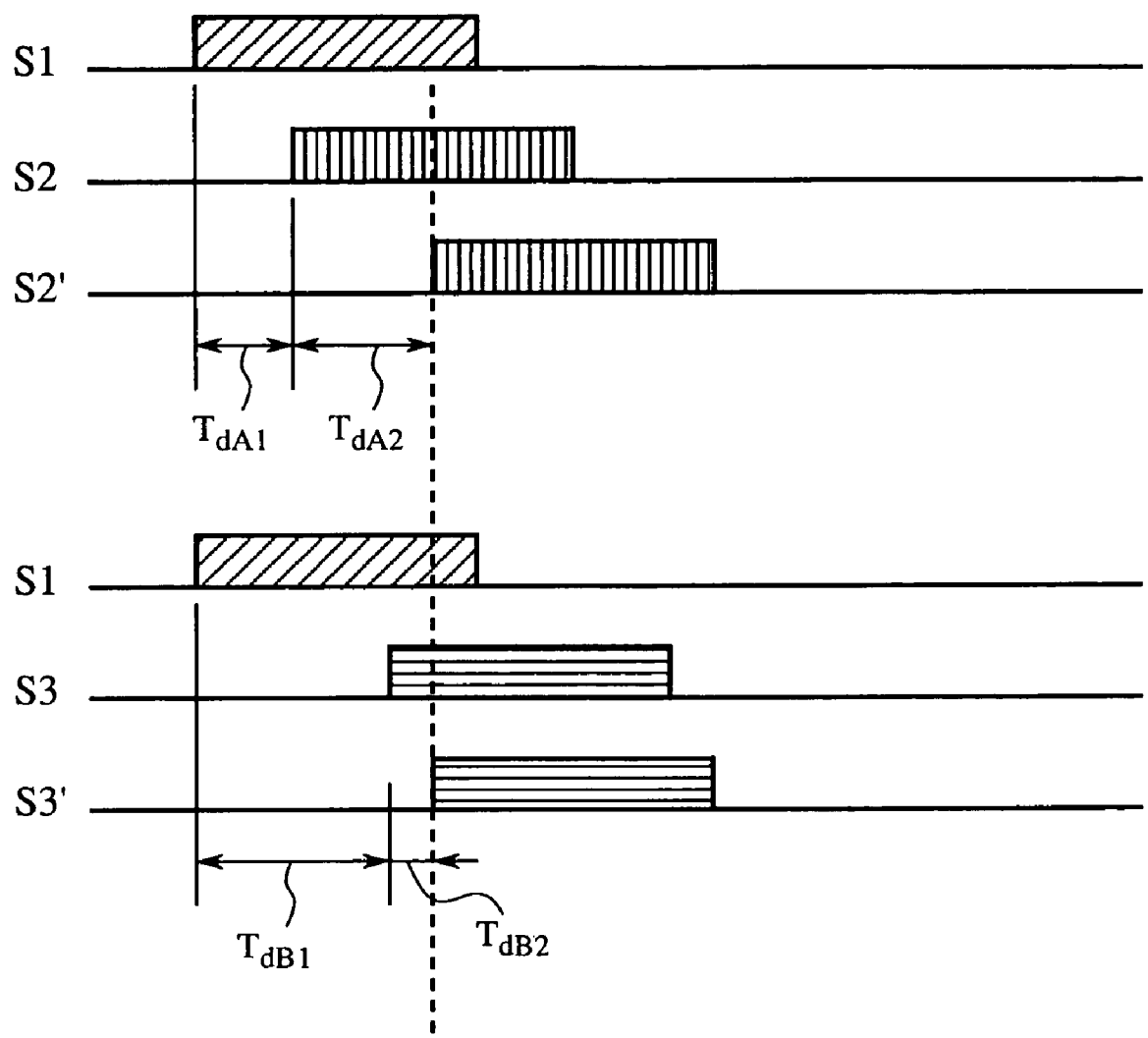
FIG. 6 is a diagram showing relationships between signal timings for illustrating the operation of the second embodiment of the digital line multiplexing unit in accordance with the present invention.

FIG. 6 is a diagram illustrating the operation of inserting the delays to the encoded speech signal fed from the high-bit-rate first speech codec 7 and to the encoded speech signal fed from the low-bit-rate second speech codec 8. In FIG. 6, the horizontal axis represents time (seconds). In addition, the symbol S1 denotes the format-converted input signal output from the trunk interface 1, S2 denotes the encoded speech signal output from the first speech codec 7, S3 denotes the encoded speech signal output from the second speech codec 8, S2' denotes the delayed encoded speech signal output from the delay element A 20, and S3' denotes the delayed encoded speech signal output from the delay element B 21.

Assume in FIG. 6 that the delay time involved in encoding by the first speech codec 7 is $T_{dA1}$ (seconds), the delay time involved in encoding by the second speech codec 8 is $T_{dB1}$ (seconds), the delay time of the delay element A 20 is $T_{dA2}$ (seconds), and the delay time of the delay element B 21 is $T_{dB2}$ (seconds). Then the delay time $T_{dA2}$ and delay time $T_{dB2}$ are set such that the following equation holds.

$$T_{dA1}+T_{dA2}=T_{dB1}+T_{dB2} \quad (\text{Eq. 1})$$

In FIG. 6, when the transmitting side codec switching unit 6 selects the first speech codec 7, the first speech codec 7 outputs the encoded speech signal (the output signal of the first speech codec) S2 after the delay time $T_{dA1}$ has elapsed from the input of the format-converted signal S1, and is supplied to the delay element A 20. Then, the delay element A 20 delays it, and outputs the delayed encoded speech signal (output signal of the delay element A 20) S2' after the delay time $T_{dA2}$ has elapsed from the time when the encoded speech signal S2 is input to the delay element A 20. As a result, the delayed encoded speech signal, the encoded speech signal output from the encoder 14, is supplied to the signal multiplexing/demultiplexing section 5 with the delay of $T_{dA1}+T_{dA2}$ (seconds).

Likewise, when the transmitting side codec switching unit 6 selects the second speech codec 8, the second speech codec 8 outputs the encoded speech signal (the output signal of the second speech codec) S3 after the delay time $T_{dB1}$ has elapsed from the input of the format-converted signal S1, and is supplied to the delay element B 21. Then, the delay element B 21 delays it, and outputs the delayed encoded speech signal (output signal of the delay element B 21) S3' after the delay time $T_{dB2}$ has elapsed from the time when the encoded speech signal S3 is input to the delay element B 21. As a result, the delayed encoded speech signal, the encoded speech signal output from the encoder 14, is supplied to the signal multiplexing/demultiplexing section 5 with the delay of $T_{dB1}+T_{dB2}$ (seconds).

In FIG. 6, an example is illustrated in which the delay time $T_{dB1}$ involved in the encoding by the second speech codec 8 is greater than the delay time $T_{dA1}$ involved in the encoding by the first speech codec 7. In this case, it is possible to set the delay time $T_{dB2}=0$ in the foregoing Equation 1 to satisfy this Equation 1. Thus, the delay element A 20 and delay element B 21 operate in such a manner that the delay time, which is produced between the input of the format-converted input signal from the transmitting side codec switching unit 6 to the encoder 14 and the output of the delayed encoded speech signal from the encoder 14 to the signal multiplexing/demultiplexing section 5, becomes constant as illustrated in FIG. 6 regardless of whether the first speech codec 7 or second speech codec 8 is selected.

As described above, in addition to the features of the foregoing embodiment 1, the present embodiment 2 of the digital line transmission unit is characterized in that the encoder/decoder (14 and 15) further comprises the first delay element (20 and 22) for delaying the speech signal output from the first speech encoding unit (7 and 10), and the second delay element (21 and 23) for delaying the speech signal output from the second speech encoding unit (8 and 11).

As is clear from the foregoing description, the present embodiment 2 is configured such that it has no processing delay difference between the individual speech codecs. Accordingly, it enables the total processing delay in the digital line transmission unit to be constant regardless of the difference in the processing delays between the speech codecs. As a result, it offers an advantage of enabling users to be unaware of the switching between the speech codecs even if it is made during the same call.

EMBODIMENT 3

Figure 7:
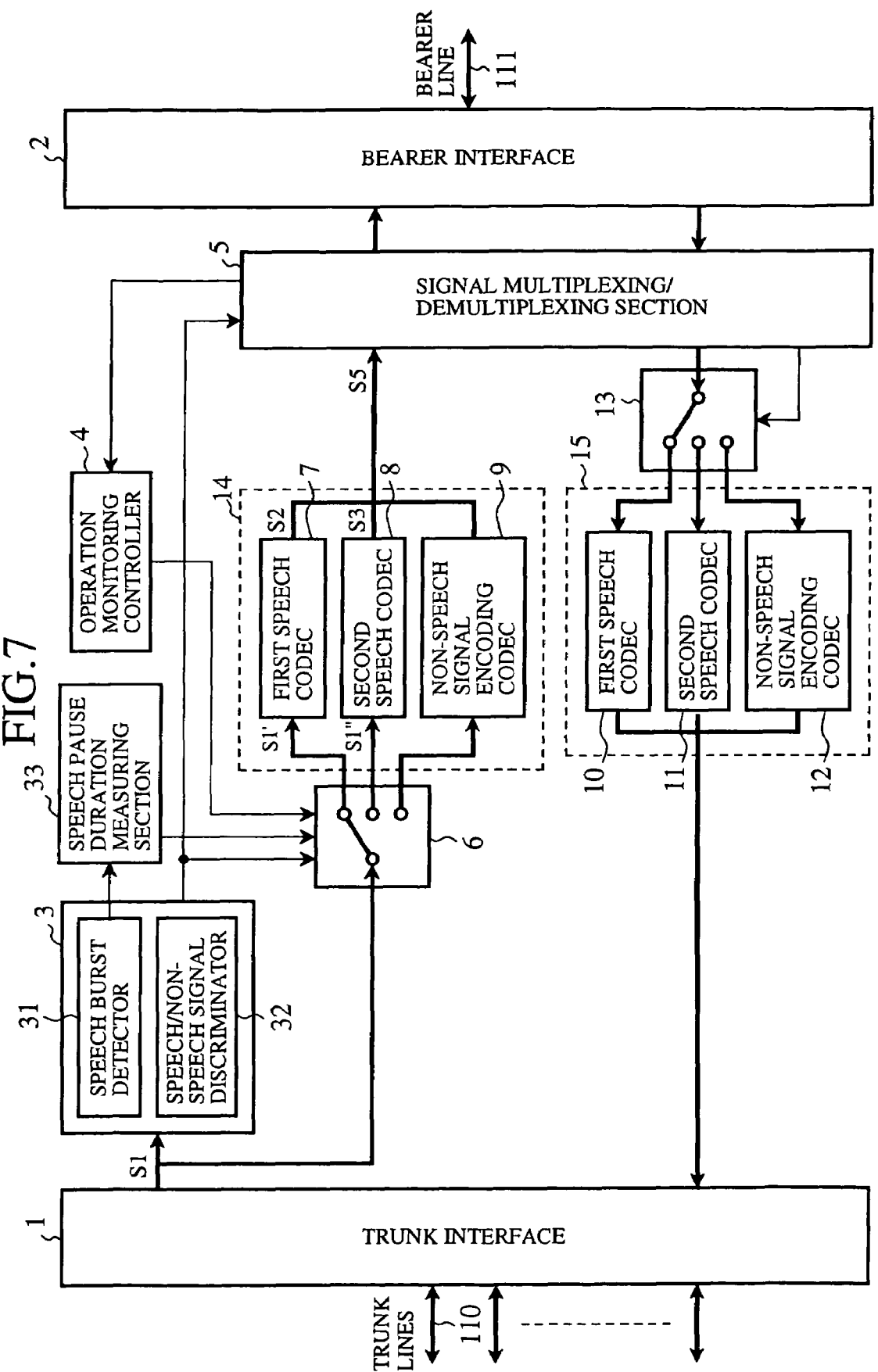
FIG. 7 is a block diagram showing a configuration of a third embodiment of the digital line transmission unit in accordance with the present invention.

FIG. 7 is a block diagram showing a configuration of an embodiment 3 of the digital line transmission unit in accordance with the present invention. In FIG. 7, the reference numeral 33 designates a speech pause duration measuring section for receiving the speech burst information from the speech burst detector 31, and for outputting a decision signal. In FIG. 7, the same reference numerals as those of the embodiment 1 as shown in FIG. 3 designate the same components.

Next, the operation will be described.

The speech burst detector 31 supplies the speech pause duration measuring section 33 with the speech burst information which indicates whether the format-converted input signal output from the trunk interface 1 is a speech burst or a speech pause. According to the speech burst information supplied, the speech pause duration measuring section 33 measures the speech pause duration in which a speech pause continues after the speech pause is detected, makes a decision as to whether the speech pause duration is greater or less than a predetermined time period, and outputs the decision result as discrimination information. The speech pause duration measuring section 33 supplies the discrimination information to the transmitting side codec switching unit 6. The transmitting side codec switching unit 6 carries out the switching of the format-converted input signal fed from the trunk interface 1 in response to the speech burst information and speech/non-speech discrimination information fed from the signal detector 3, the control information fed from the operation monitoring controller 4, and the discrimination information fed from the speech pause duration measuring section 33.

Next, the switching operation of the signal will be described in more detail with reference to FIG. 8.

Figure 8:
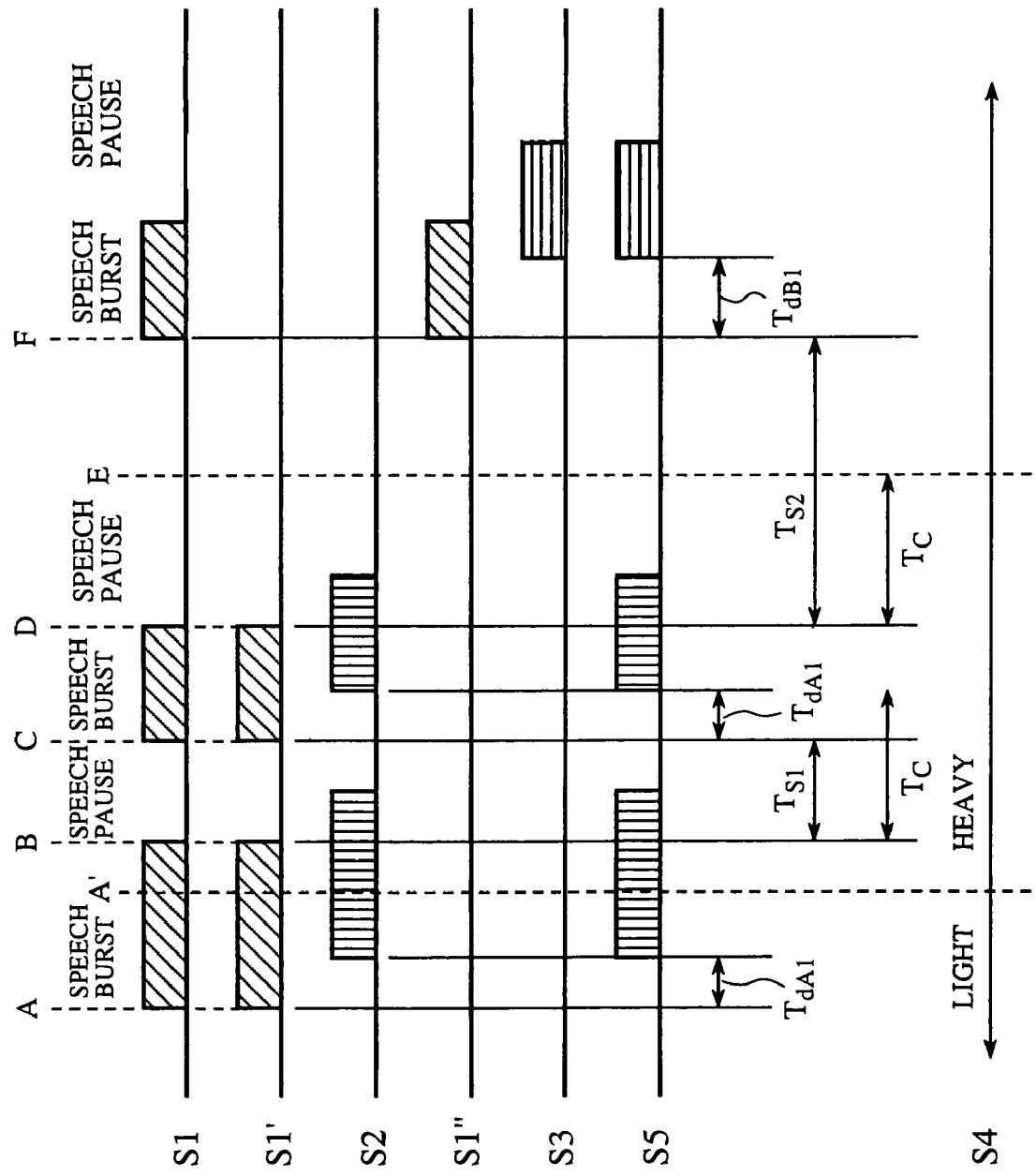
FIG. 8 is a diagram showing relationships between signal timings for illustrating the operation of the third embodiment of the digital line multiplexing unit in accordance with the present invention.

FIG. 8 is a diagram illustrating the switching operation from the first speech codec 7 to second speech codec 8 carried out in response to the speech pause duration of the input signal fed from the trunk lines 110. In FIG. 8, the horizontal axis represents time (second). In addition, the symbol S1 denotes the format-converted input signal output from the trunk interface 1, S1' denotes the format-converted input signal supplied to the first speech codec 7, and S1" denotes the format-converted input signal supplied to the second speech codec 8. The symbol S2 denotes the encoded speech signal output from the first speech codec 7, and S3 denotes the encoded speech signal output from the second speech codec 8. The symbol S4 denotes the traffic volume of the bearer line 111, and the symbol S5 denotes the encoded signal supplied to the signal multiplexing/demultiplexing section 5.

Assume in FIG. 8 that the first speech codec 7 is a high-bit-rate speech codec, and the second speech codec 8 is a low-bit-rate speech codec, and that the first speech codec 7 is selected when the bearer line 111 is not congested, and the second speech codec 8 is selected when the bearer line 111 is congested.

When the format-converted input signal output from the trunk interface 1 is a speech signal, the speech burst detector 31 in the signal detector 3 detects the speech burst, and the speech/non-speech signal discriminator 32 makes a decision that it is the speech signal. The detection results are delivered to the transmitting side codec switching unit 6 as the speech burst information and speech/non-speech discrimination information.

According to the traffic information fed from the signal multiplexing/demultiplexing section 5, the operation monitoring controller 4 monitors the congestion of the bearer line 111. When the bearer line 111 is not congested, the transmitting side codec switching unit 6 carries out the switching such that the format-converted input signal S1 from the trunk interface 1 is supplied to the first speech codec 7 (time A of FIG. 8), according to the control information fed from the operation monitoring controller 4 and the speech burst information and speech/non-speech discrimination information fed from the signal detector 3.

The first speech codec 7 outputs the encoded speech signal S2 delayed from the format-converted input signal S1' by a delay time $T_{dA1}$ (seconds) by the encoding.

Next, when the format-converted input signal S1 enters the speech pause (time B of FIG. 8), the speech pause duration measuring section 33 starts to measure the speech pause duration. The speech pause duration measuring section 33 has a predetermined time period $T_C$, and makes a decision as to whether the speech pause duration is larger or smaller than the preset time period $T_C$. Assume that the format-converted input signal S1 returns to a speech burst after the speech pause duration $T_{S1}$ has elapsed (time C of FIG. 8). In FIG. 8, the traffic S4 of the bearer line changes from light to heavy (from a non-congested state to a congested state) before the speech pause duration $T_{S1}$ has elapsed (time A' of FIG. 8). When the speech pause duration is smaller than the preset time period $T_C$, even if the bearer line 111 is congested, the format-converted input signal S1 from the trunk interface 1 is supplied to the first speech codec 7 successively. In other words, since the speech pause duration $T_{S1}$ is smaller than the preset time period $T_C$ of FIG. 8, the first speech codec 7 continues encoding without switching the speech codec.

The first speech codec 7 outputs the encoded speech signal S2 delayed from the format-converted input signal S1' by the delay time $T_{dA1}$ (seconds) by the encoding.

Next, if the format-converted input signal S1 enters the speech pause again (time D of FIG. 8), the speech pause duration measuring section 33 starts to measure the speech pause duration. When the measured speech pause duration exceeds the preset time period $T_C$ (time E of FIG. 8), the discrimination signal is delivered to the transmitting side codec switching unit 6. After that, the format-converted input signal S1 becomes the speech burst after the speech pause duration $T_{S2}$ has elapsed (time F of FIG. 8).

Receiving the discrimination signal from the speech pause duration measuring section 33 (time E of FIG. 8), the transmitting side codec switching unit 6 makes the switching to the second speech codec 8 because it has already (time A' of FIG. 8) received the control information instructing to carry out switching to the low-bit-rate codec (indicating that the bearer line 111 is in the congested state) from the operation monitoring controller 4. As a result, the switching to the second speech codec 8 has been completed before the format-converted input signal S1 becomes the speech burst when the speech pause duration $T_{S2}$ has elapsed (time F of FIG. 8).

The second speech codec 8 outputs the encoded speech signal S3 delayed from the format-converted input signal S1" by the delay time $T_{dB1}$ (seconds) by the encoding.

By the foregoing processing, the encoded signal S5 supplied from the encoder 14 to the signal multiplexing/demultiplexing section 5 is composed of the superimposition of the encoded speech signal S2 output from the first speech codec 7 and the encoded speech signal S3 output from the second speech codec 8 as illustrated in FIG. 8.

As described above, in addition to the characteristics of the foregoing embodiment 1, the present embodiment 3 of the digital line transmission unit further includes the speech pause duration measuring section (33) for measuring the speech pause duration in which the input signal to the encoder/decoder (14 and 15) is in the speech pause, and carries out the switching from the first speech encoding unit (7 and 10) to the second speech encoding unit (8 and 11) or vice verse when the speech pause duration is longer than the preset time period.

As is clear from the foregoing description, the present embodiment 3 is configured such that it measures the speech pause duration in which the speech pause continues, and switches the speech codec when the speech pause duration is greater than the preset time period. Thus, it offers an advantage of being able to make the user scarcely aware of the difference in the sound quality before and after the switching between the speech codecs, thereby enabling the user to carry out more natural conversation without being aware of the switching.

EMBODIMENT 4

Figure 9:
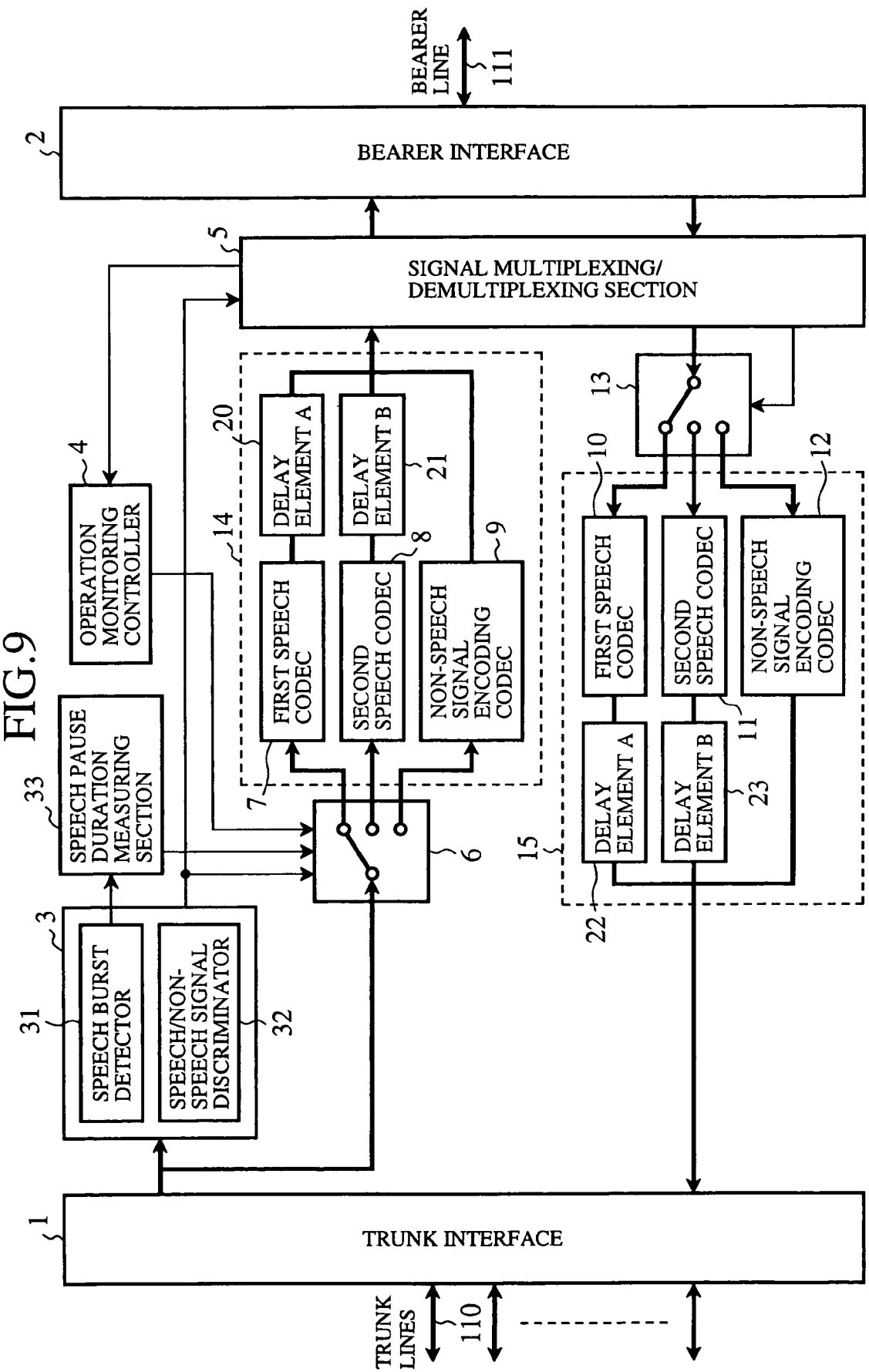
FIG. 9 is a block diagram showing a configuration of a fourth embodiment of the digital line transmission unit in accordance with the present invention.

FIG. 9 is a block diagram showing a configuration of an embodiment 4 of the digital line transmission unit in accordance with the present invention. In FIG. 9, the same reference numerals as those of the embodiments 1, 2 and 3 as shown in FIGS. 3, 5 and 7 designate the same components. The present embodiment 4 has a configuration in which the speech pause duration measuring section 33 of the embodiment 3 is added to the embodiment 2 of the digital line transmission unit.

Next, the operation will be described.

The encoded speech signal output from the first speech codec 7 is supplied to the delay element A 20, and the encoded speech signal output from the second speech codec 8 is supplied to the delay element B 21. As described in the operation of the embodiment 2 with reference to FIG. 6, the delay element A 20 and delay element B 21 operate such that the delay times (in the encoder 14) from the time when the individual codecs encode the format-converted input signal fed from the trunk interface 1 to the time when they supply the encoded signals to the signal multiplexing/demultiplexing section 5 become equal. As described in the operation of the embodiment 3 with reference to FIG. 8, the speech pause duration detector 33 measures the speech pause duration from the speech burst information output from the speech burst detector 31 of the signal detector 3. It also makes a decision as to whether the speech pause duration is greater or less than the predetermined time period to produce the discrimination information, and supplies the discrimination information to the transmitting side codec switching unit 6.

According to the present embodiment 4, the user does not have an unnatural feeling at the switching of the speech codec for encoding the speech signal in response to the congested state of the bearer line 111, which is decided by the operation monitoring controller 4. This is because the delay element A 20 and delay element B 21 equalize the delay times in the encoder 14, and the speech pause duration measuring section 33 enables the switching of the speech codecs only when the speech pause duration exceeds a certain time period.

As described above, in addition to the features of the embodiment 2, the present embodiment 4 of the digital line transmission unit further includes the speech pause duration measuring section (33) for measuring the speech pause duration in which the input signal to the encoder/decoder (14 and 15) is in a speech pause, and carries out the switching from the first speech encoding unit (7 and 10) to the second speech encoding unit (8 and 11) or vice versa when the speech pause duration is longer than the preset time period.

As is clear from the foregoing description, the present embodiment 4 is configured such that it has no processing delay difference between the individual speech codecs. Accordingly, it enables the total processing delay in the digital line transmission unit to be constant regardless of the difference in the processing delays between the speech codecs. As a result, it offers an advantage of enabling users to be unaware of the switching between the speech codecs even if it is made in the same call.

Furthermore, the present embodiment 4 is configured such that it measures the speech pause duration in which the speech pause continues, and switches the speech codec when the speech pause duration is greater than the preset time period. Thus, it offers an advantage of being able to make the user scarcely aware of the difference in the sound quality before and after the switching between the speech codecs, thereby enabling the user to conduct more natural conversation without being aware of the switching.

EMBODIMENT 5

Figure 10:
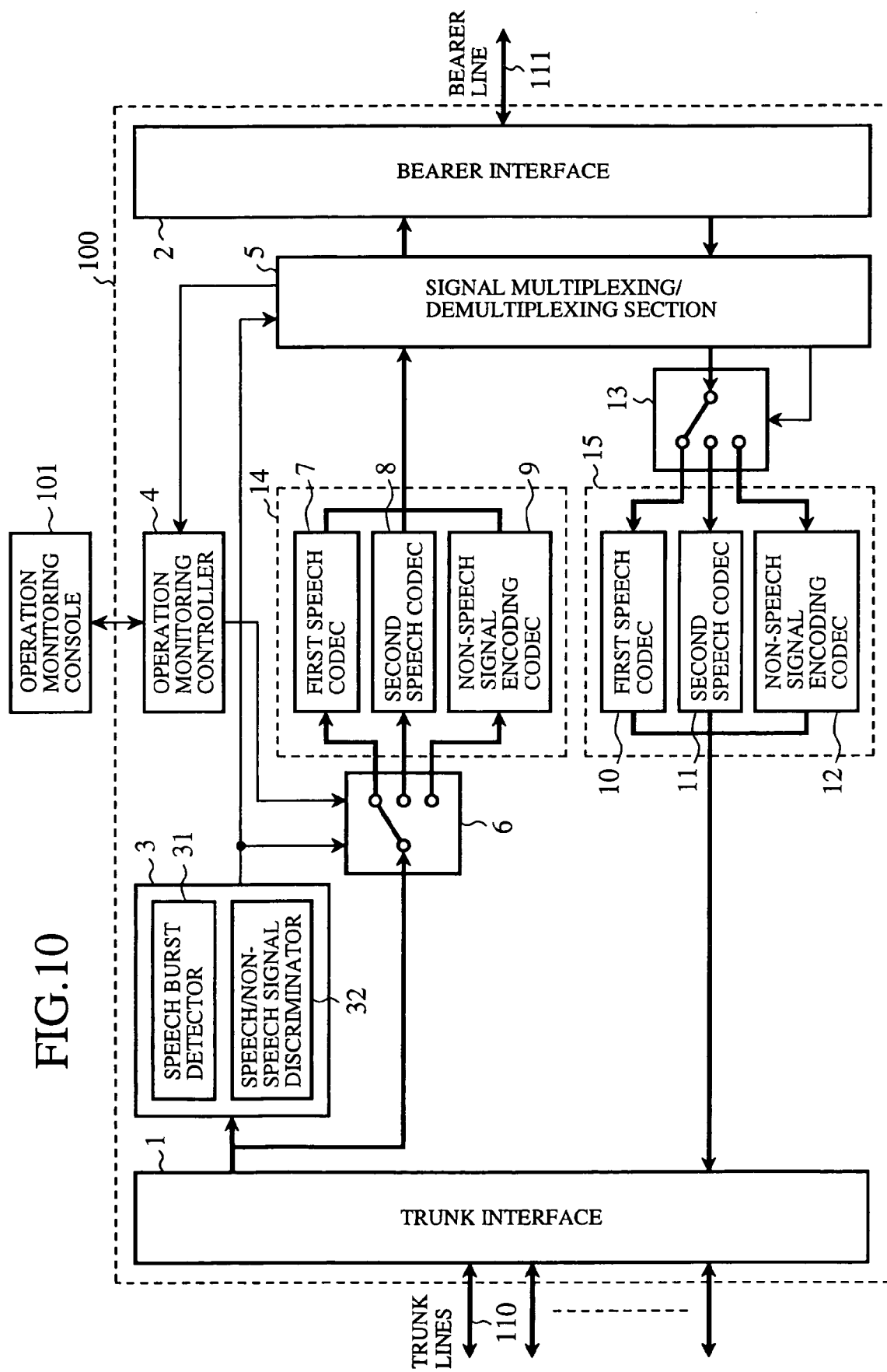
FIG. 10 is a block diagram showing a configuration of a fifth embodiment of the digital line transmission unit in accordance with the present invention.

FIG. 10 is a block diagram showing a configuration of an embodiment 5 of the digital line transmission unit in accordance with the present invention. In FIG. 10, the reference numeral 100 designates the embodiment 1 of the digital line transmission unit in accordance with the present invention. The reference numeral 101 designates an operation monitoring console for exchanging operation monitoring information with the digital line transmission unit 100. The operation monitoring console 101 is used for monitoring the operational information about the digital line transmission unit 100, and for setting various parameters of the operation. In FIG. 10, the same reference numerals as those of the embodiment 1 as shown in FIG. 3 designate the same components.

Next, the operation will be described.

The operation monitoring controller 4 of the digital line transmission unit 100 is connected to the operation monitoring console 101, and exchanges with it the operation monitoring information such as the state of the digital line transmission unit, the state of the bearer line 111, and the set-up values of the digital line transmission unit 100.

The operation monitoring console 101 has a man-machine interface, that is, the function of displaying and inputting, for the operator to monitor the operation monitoring information, or for making the setting of the digital line transmission unit 100. When the operation monitoring controller 4 of the embodiment 1 of the digital line transmission unit 100 makes a decision that it is necessary to switch from the high-bit-rate speech codec to the low-bit-rate speech codec because of an increase in the traffic of the bearer line, or reversely from the low-bit-rate speech codec to the high-bit-rate speech codec because of a decrease in the traffic of the bearer line, it delivers the decision result to the transmitting side codec switching unit 6 as the control information.

In this case, a decision threshold value for making a decision as to the traffic volume is set by an operator through the man-machine interface of the operation monitoring console 101. The determined decision threshold value is delivered to the operation monitoring controller 4 of the digital line transmission unit 100 to be used as a reference for discriminating the traffic volume of the bearer line 111. The decision result about the traffic volume made with reference to the decision threshold value is supplied to the transmitting side codec switching unit 6 as the control information, so that it carries out the switching between the speech codecs. Since the details of the operation of the switching in the digital line transmission unit 100 are the same as those of the embodiment 1, the description thereof is omitted here.

Although the present embodiment 5 is described by way of example in which the operation monitoring console 101 is added to the embodiment 1 of the digital line transmission unit 100, this is not essential. For example, the present embodiment 5 can be configured by adding the operation monitoring console 101 to the embodiment 2 of the digital line transmission unit as shown in FIG. 5.

As described above, in addition to the characteristics of the embodiment 1, the present embodiment 5 of the digital line transmission unit further includes the operation monitoring console (101) for conducting the monitoring of the operational information and the individual settings. The operation monitoring console (101) is used to set the decision threshold value for making a decision as to the traffic volume of the digital line so that the switching from the first speech encoding unit (7 and 10) to the second speech encoding unit (8 and 11) or vice verse is made with reference to the decision threshold value.

In addition to the characteristics of the embodiment 2, the present embodiment 5 of the digital line transmission unit further includes the operation monitoring console (101) for conducting the monitoring of the operational information and the individual settings. The operation monitoring console (101) is used to set the decision threshold value for making a decision as to the traffic volume of the digital line so that the switching from the first speech encoding unit (7 and 10) to the second speech encoding unit (8 and 11) or vice verse is made with reference to the decision threshold value.

As is clear from the foregoing description, the present embodiment 5 is configured such that it uses the operation monitoring console to set the decision threshold value. Accordingly, it offers an advantage of enabling the operator to determine the decision threshold value considering the used condition of the line, thereby making it possible to improve the convenience of the digital line transmission unit.

EMBODIMENT 6

Figure 11:
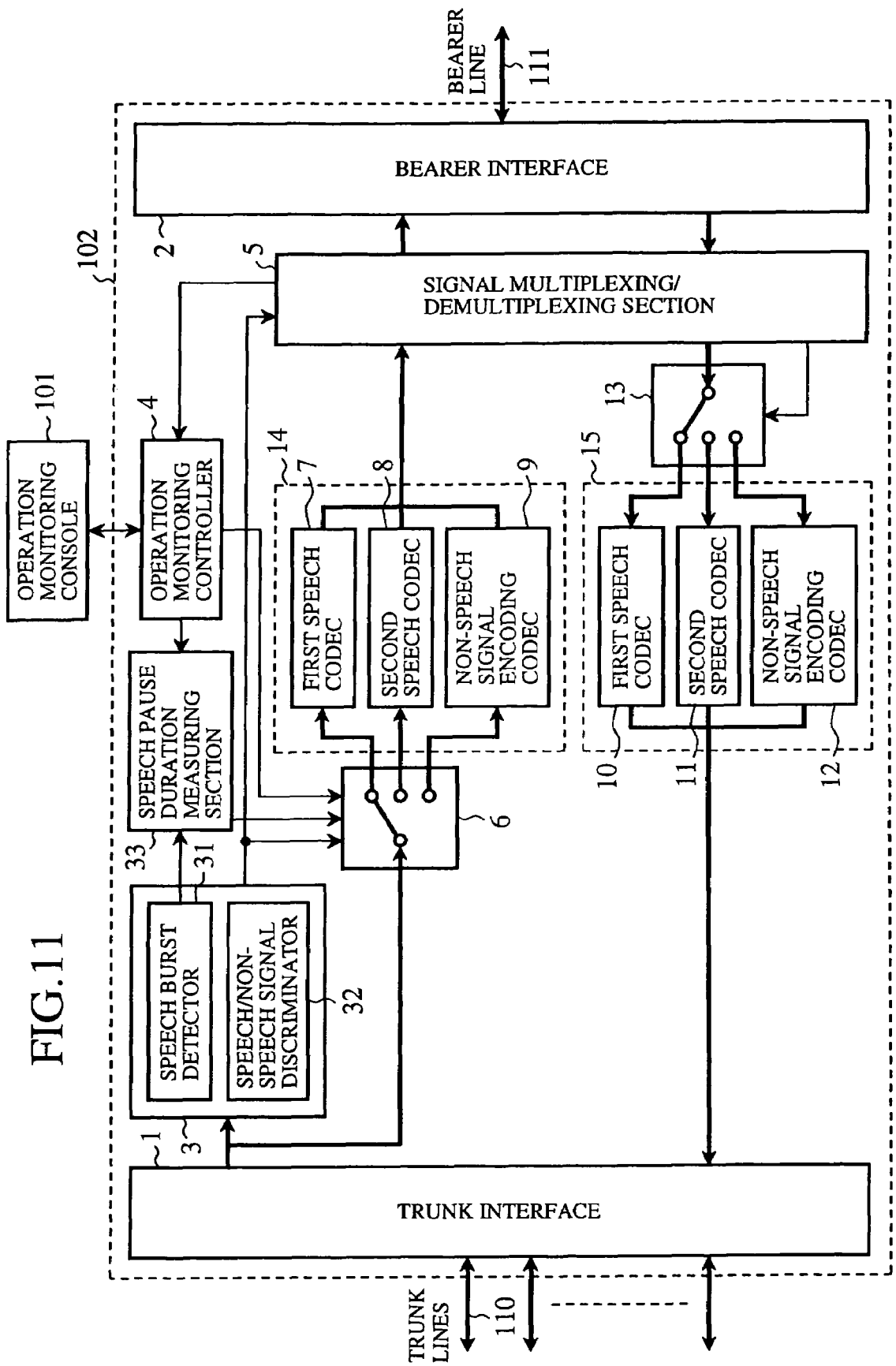
FIG. 11 is a block diagram showing a configuration of a sixth embodiment of the digital line transmission unit in accordance with the present invention.

FIG. 11 is a block diagram showing a configuration of an embodiment 6 of the digital line transmission unit in accordance with the present invention. In FIG. 11, the reference numeral 102 designates the embodiment 3 of the digital line transmission unit in accordance with the present invention. The reference numeral 101 designates an operation monitoring console for exchanging operation monitoring information with the digital line transmission unit 102. The operation monitoring console 101 is used for monitoring the operational information about the digital line transmission unit 102, and for setting various parameters on the operation. In FIG. 11, the same reference numerals as those of the embodiment 3 as shown in FIG. 7 designate the same components.

Next, the operation will be described.

The operation monitoring controller 4 of the digital line transmission unit 102 is connected to the operation monitoring console 101, so that an operator specifies the preset time period $T_C$ of the speech pause duration measuring section 33 of the digital line transmission unit 102 via the man-machine interface of the operation monitoring console 101. The operator determines the preset time period $T_C$ considering the characteristics of the line using the digital line transmission unit 102, the condition as to whether emphasis is placed on the sound quality or multiplexing efficiency, and the like. The determined preset time period $T_C$ is delivered to the operation monitoring controller 4 of the digital line transmission unit 102, and is set in the speech pause duration measuring section 33.

The speech pause duration measuring section 33 compares the determined preset time period $T_C$ with the speech pause duration. The preset time period $T_C$ specified by the operator is used by the speech pause duration measuring section 33 as the preset time period $T_C$ of FIG. 8 described in connection with the foregoing embodiment 3. The decision result obtained by using the preset time period $T_C$ as the reference is supplied to the transmitting side codec switching unit 6 as the discrimination signal so that the transmitting side codec switching unit 6 carries out the switching of the speech codec. Since the details of the switching operation of the digital line transmission unit 102 are the same as those of the foregoing embodiment 3, the description thereof is omitted here.

Although the present embodiment 6 is described by way of example in which the operation monitoring console 101 is added to the embodiment 3 of the digital line transmission unit 102, this is not essential. For example, the present embodiment 6 can be configured by adding the operation monitoring console 101 to the embodiment 4 of the digital line transmission unit as shown in FIG. 9.

As described above, in addition to the characteristics of the embodiment 3, the present embodiment 6 of the digital line transmission unit further includes the operation monitoring console (101) for conducting the monitoring of the operational information and the individual settings. The operation monitoring console (101) is used to set the preset time period for making a decision as to the speech pause duration so that the switching from the first speech encoding unit (7 and 10) to the second speech encoding unit (8 and 11) or vice verse is made with reference to the preset time period.

In addition to the characteristics of the embodiment 4, the present embodiment 6 of the digital line transmission unit further includes the operation monitoring console (101) for conducting the monitoring of the operational information and the individual settings. The operation monitoring console (101) is used to set the preset time period for making a decision as to the speech pause duration so that the switching from the first speech encoding unit (7 and 10) to the second speech encoding unit (8 and 11) or vice verse is made with reference to the decision threshold value.

As is clear from the foregoing description, the present embodiment 6 is configured such that it uses the operation monitoring console to set the decision threshold value. Accordingly, it offers an advantage of enabling the operator to determine the decision threshold value considering the used state of the line, thereby making it possible to improve the convenience of the digital line transmission unit.

EMBODIMENT 7

Figure 12:
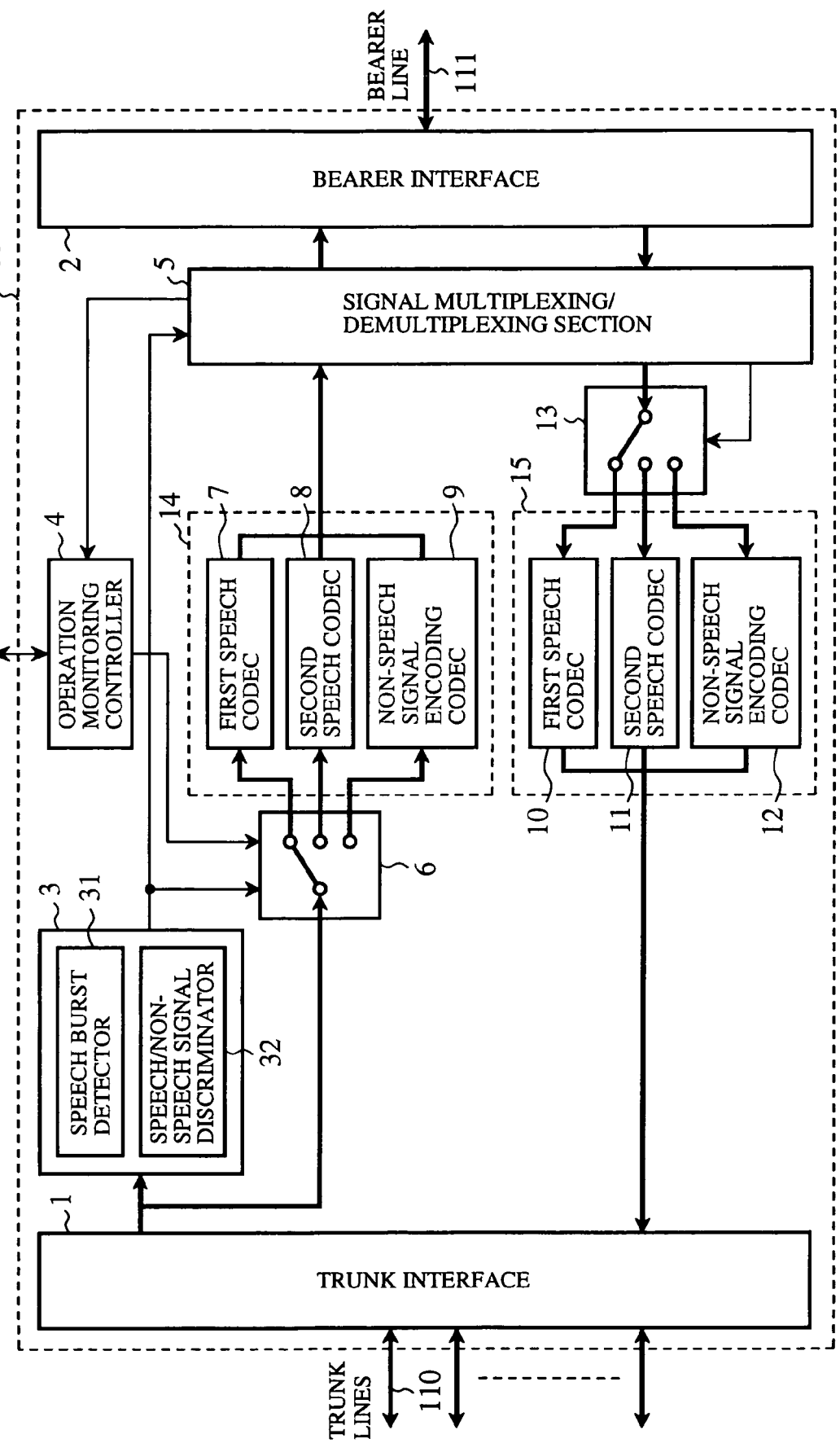
FIG. 12 is a block diagram showing a configuration of a seventh embodiment of the digital line transmission unit in accordance with the present invention.

FIG. 12 is a block diagram showing a configuration of an embodiment 7 of the digital line transmission unit in accordance with the present invention. In FIG. 12, the reference numeral 103 designates a timer for counting time. In FIG. 12, the same reference numerals as those of the embodiment 5 as shown in FIG. 10 designate the same components. The present embodiment 7 is configured such that it further includes the timer 103 in the operation monitoring console 101 in the embodiment 5 of the digital line transmission unit.

Next, the operation will be described.

Generally, the traffic on a communication line varies in the daytime and in the middle of the night. For example, the traffic of speech signals reduces in the middle of the night, and increases in the daytime, particularly in the evening. Thus, there is a correlation between the traffic and time. The present embodiment 7 includes in the operation monitoring console 101 a plurality of decision threshold values to be set in the operation monitoring controller 4 of the embodiment 5 for deciding the traffic volume, so that the operation monitoring console 101 automatically delivers a predetermined one of the decision threshold values to the operation monitoring controller 4 of the digital line transmission unit 100 at the time determined by the timer 103.

As for the decision threshold values to be delivered from the operation monitoring console 101 to the operation monitoring controller 4 in the digital line transmission unit 100, the operator sets their types and the time of delivering them in the operation monitoring console 101 in advance.

The digital line transmission unit 100 makes a decision as to the traffic volume with reference to the decision threshold value fed from the operation monitoring console 101, and supplies the decision result to the transmitting side codec switching unit 6 as the control signal. Consequently, the digital line transmission unit 100 decides the traffic volume with reference to the decision threshold value that varies in accordance with the time, and carries out the switching of the speech codec in response to the decision result.

Although the present embodiment 7 is described by way of example in which the timer 103 is provided in the operation monitoring console 101 in the foregoing embodiment 5, this is not essential. For example, the present embodiment 7 can be configured such that the timer 103 is equipped in the operation monitoring console 101 in the embodiment 6 shown in FIG. 11, so that the operation monitoring console 101 holds a plurality of preset time periods, and delivers the predetermined type of the preset time period to the operation monitoring controller 4 of the digital line transmission unit 100 at the time determined by the timer 103 to supply it to the speech pause duration measuring section 33.

As described above, in addition to the characteristics of the embodiment 5, the present embodiment 7 of the digital line transmission unit includes the timer (103) for enabling the operation monitoring console (101) to count the time, and uses the different types of the decision threshold values as the reference in accordance with the time counted by the timer (103).

In addition to the characteristics of the embodiment 6, the present embodiment 7 of the digital line transmission unit includes the timer (103) for counting the time in the operation monitoring console (101), and uses the different types of the preset time periods in accordance with the time counted by the timer (103).

As is clear from the foregoing description, the present embodiment 7 is configured such that it includes the timer in the operation monitoring console to count the time, and that it uses the different types of the decision threshold values or preset time periods in response to the time counted by the timer. Thus, it offers an advantage of being able to reduce the burden imposed on the operator, and carry out more sophisticated operation in accordance with the time, thereby making it possible to enhance the convenience of the digital line transmission unit.

INDUSTRIAL APPLICABILITY

As described above, the digital line transmission unit in accordance with the present invention is suitable for applications that carry out the switching between the speech codecs in response to the conditions of the communication line with making effective use of the communication line with maintaining natural feeling of the auditory perception.

What is claimed is:

1. A digital line transmission unit for carrying out compression encoding, said digital line transmission unit, comprising:
   an encoder/decoder including
      a first speech encoding unit configured to encode and decode a speech signal,
      a second speech encoding unit configured to encode and decode the speech signal, and
      a non-speech encoding unit configured to encode and decode a non-speech signal;
   a signal discriminator including
      a speech burst detector configured to detect whether an input signal to said encoder/decoder is a speech burst or speech pause, and
      a speech/non-speech signal discriminator for configured to determine whether the input signal is a speech signal or non-speech signal;
   a signal multiplexing/demultiplexing section configured to multiplex outputs of said first encoding unit, said second speech encoding unit, and said non-speech encoding unit; an operation monitoring controller configured to output a switch control signal upon determining a change in a state of congestion of a digital line; and
   a switching unit configured to switch the input signal between said first, second, and non-speech encoding units,
   upon indication of a change in the state of congestion of the digital line, the switching occurring during a detected speech pause and after terminating encoding of the input signal.

2. The digital line transmission unit according to claim 1, wherein
   the first encoding unit has an encoding rate of greater than or equal to 8 kbit/s;
   the second encoding unit has an encoding rate less than or equal to 4 kbit/s; and
   the switching unit is further configured to switch the input signal to the first encoding unit upon indication that the state of congestion of the digital line changes to an uncongested state, and switch the input signal to the second encoding unit upon indication that the state of congestion of the digital line changes to a congested state.

3. The digital line transmission unit according to claim 1, further comprising:
   an operation monitoring console configured to monitor operational information and receive an input from a user interface
   as a decision threshold value to determine the state of congestion of the digital line.

4. The digital line transmission unit according to claim 3, wherein said operation monitoring console comprises a timer configured to count time, and wherein
   a plurality of decision threshold values are used in determining the state of congestion of the digital line in accordance with the time counted by said timer.

5. The digital line transmission unit according to claim 1, further comprising:
   a speech pause duration measuring section configured to measure a speech pause duration of the speech pause of the input signal fed to said encoder/decoder, wherein the switching unit is further configured to switch between said first, second, and non-speech encoding units when the speech pause duration is longer than a preset time period.

6. The digital line transmission unit according to claim 5, further comprising:
an operation monitoring console configured to monitor operational information and receive an input from a user interface as the preset time period.

7. The digital line transmission unit according to claim 6, wherein said operation monitoring console comprises a timer configured to count time, and wherein
the preset time period varies in accordance with the time counted by said timer.

8. The digital line transmission unit according to claim 1, wherein said encoder/decoder further comprises:
a first delay element configured to delay a speech signal output from said first speech encoding unit; and
a second delay element configured to delay a speech signal output from said second speech encoding unit.

9. The digital line transmission unit according to claim 8, wherein a first sum including a delay from the first delay element and an encoding delay from the first encoding unit is equal to a second sum including a delay from the second delay element and an encoding delay from the second encoding unit.

10. The digital line transmission unit according to claim 8, further comprising:
an operation monitoring console configured to monitor operational information and receive an input from a user interface
as a decision threshold value to determine the state of congestion of the digital line.

11. The digital line transmission unit according to claim 10, wherein said operation monitoring console comprises a timer configured to count time, and wherein
a plurality of decision threshold values are used in determining the state of congestion of the digital line in accordance with the time counted by said timer.

12. The digital line transmission unit according to claim 8, further comprising:
a speech pause duration measuring section configured to measure a speech pause duration of the speech pause of the input signal fed to said encoder/decoder, wherein
the switching unit is further configured to switch between said first, second, and non-speech encoding units when the speech pause duration is longer than a preset time period.

13. The digital line transmission unit according to claim 12, further comprising:
an operation monitoring console configured to monitor operational information and receive an input from a user interface as the preset time period.

14. The digital line transmission unit according to claim 13, wherein said operation monitoring console comprises a timer configured to count time, and wherein
the preset time varies in accordance with the time counted by said timer.

15. A digital line transmission unit, comprising:
a plurality of encoders that differ in an encoding scheme or in a bit rate of encoding;
an interface configured to supply outputs of said encoders to a line;
a controller configured to output a switch control signal upon determining a change in a state of congestion of the line;
a speech pause duration measuring section configured to measure a speech pause duration of an input signal to the plurality of encoders; and
a switching unit configured to switch the input signal between said plurality of encoders upon indication of a change in the state of congestion of the line, the switching occurring during a detected speech pause and after terminating encoding of the speech signal when the speech pause duration measured by the speech pause duration measuring section is longer than a preset time period.

16. The digital line transmission unit according to claim 15, wherein
one of the plurality of encoders has an encoding rate greater than or equal to 8 kbit/s,
another one of the plurality of encoders has an encoding rate less than or equal to 4 kbit/s, and
the switching unit is further configured to switch the speech signal to the encoding unit having the encoding rate greater than or equal to 8 kbit/s upon indication that the state of congestion of the line changes to an uncongested state, and switch the speech signal to the encoding unit having the encoding rate less than or equal to 4 kbit/s upon indication that the state of congestion of the line changes to a congested state.

17. The digital line transmission unit according to claim 15, wherein the plurality of encoders includes a first speech encoder configured to encode a speech signal in the input signal, a second speech encoder configured to encode the speech signal, and a non-speech encoder configured to encode a non-speech signal in the input signal.

18. The digital line transmission unit of claim 17, wherein the first speech encoder is configured to encode the speech signal according to a first encoding scheme and the second speech encoder is configured to encode the speech signal according to a second encoding scheme different than the first encoding scheme.

* * * * *